(12) United States Patent
Masson (10) Patent No.: US 8,767,543 B2
(45) Date of Patent: Jul. 1, 2014

(54) TERMINAL AND METHOD FOR STORING AND RETRIEVING MESSAGES IN A CONVERGED IP MESSAGING SERVICE

(75) Inventor: Romain Masson, Roissy CDG Cedex (FR)

(73) Assignee: LG Electronics Inc., Seoul (KR)

( * ) Notice: Subject to any disclaimer, the term of this patent is extended or adjusted under 35 U.S.C. 154(b) by 1097 days.

(21) Appl. No.: 12/348,114

(22) Filed: Jan. 2, 2009

(65) Prior Publication Data

US 2009/0213841 A1  Aug. 27, 2009

Related U.S. Application Data

(60) Provisional application No. 61/030,940, filed on Feb. 22, 2008, provisional application No. 61/097,022, filed on Sep. 15, 2008.

(51) Int. Cl.
*H04L 12/26* (2006.01)
*H04L 12/56* (2006.01)

(52) U.S. Cl.
USPC .......................................... 370/231; 370/401

(58) Field of Classification Search
USPC .................................. 370/231, 401; 709/227
See application file for complete search history.

(56) References Cited

U.S. PATENT DOCUMENTS

| | | | |
|---|---|---|---|
| 6,770,940 B2 | 8/2004 | Yamauchi | |
| 7,041,544 B2 | 5/2006 | Yamauchi | |
| 7,054,905 B1 * | 5/2006 | Hanna et al. | 709/206 |
| 7,929,530 B2 * | 4/2011 | Marshall et al. | 370/389 |
| 2003/0028647 A1 * | 2/2003 | Grosu | 709/227 |
| 2003/0145038 A1 * | 7/2003 | Bin Tariq et al. | 709/202 |
| 2003/0161448 A1 | 8/2003 | Parolkar et al. | |
| 2003/0227060 A1 | 12/2003 | Yamauchi | |
| 2004/0246787 A1 | 12/2004 | Yamauchi | |
| 2005/0193070 A1 * | 9/2005 | Brown et al. | 709/206 |
| 2005/0238002 A1 | 10/2005 | Rasanen | |
| 2006/0069744 A1 * | 3/2006 | Alberti et al. | 709/217 |

(Continued)

FOREIGN PATENT DOCUMENTS

| | | |
|---|---|---|
| EP | 1819125 A1 | 8/2007 |
| KR | 10-2005-0099543 A | 10/2005 |
| KR | 10-2006-0084322 A | 7/2006 |

OTHER PUBLICATIONS

B. Campbell, "RFC 3428: Session Initiation Protocol (SIP) Extension for Instant Messaging," Dec. 2002, Network Working Group, p. 1-18.*

*Primary Examiner* — Dang Ton
*Assistant Examiner* — Ryan Kavleski
(74) *Attorney, Agent, or Firm* — Birch, Stewart, Kolasch & Birch, LLP (57) ABSTRACT

A terminal, server and method for storing and selectively retrieving SIP-based messages, are discussed. According to an embodiment, the present invention provides a method for controlling a SIP-based message by a control server, which includes receiving a SIP-based message; determining a manner in which the SIP-based message is to be processed based on user preference information; transmitting the SIP-based message and indication information to a storage server based on the determination result, the indication information indicating if the SIP-based message is to be sent back with link information, the link information including a reference to the SIP-based message; receiving a part of the SIP-based message and the link information from the storage server; and transmitting the part of the SIP-based message and the link information to a terminal, whereby the SIP-based message can be selectively retrieved.

10 Claims, 6 Drawing Sheets

(56) References Cited

U.S. PATENT DOCUMENTS

| | | | |
|---|---|---|---|
| 2006/0129646 A1* | 6/2006 | Rhee et al. | 709/206 |
| 2006/0159245 A1 | 7/2006 | Kim et al. | |
| 2007/0168436 A1* | 7/2007 | Andam | 709/206 |
| 2008/0123686 A1* | 5/2008 | Lee et al. | 370/466 |
| 2008/0170563 A1* | 7/2008 | Zhu et al. | 370/352 |
| 2008/0281971 A1* | 11/2008 | Leppanen et al. | 709/228 |
| 2008/0294729 A1* | 11/2008 | Ionescu et al. | 709/206 |
| 2009/0187622 A1* | 7/2009 | Xie | 709/203 |
| 2009/0193329 A1* | 7/2009 | Oh et al. | 715/234 |
| 2009/0228606 A1* | 9/2009 | Mccarthy et al. | 709/248 |
| 2009/0287784 A1* | 11/2009 | Haruna | 709/206 |

\* cited by examiner

MESSAGE sip: bob@home.com SIP/2.0
From: sip:alice@home.com
  To: sip:bob@home2.com
  Call-ID: zertz8767iuhi
61 — CSeq: 1 MESSAGE
  ↳ GUID: 1234
  Content-Type: multipart/mixed; boundary="boundary99"

--boundary99
62 — Content-Type: image/jpeg
  ↳ Content-ID: attach id@mmss.com

FIG. 4A

```
<Get>
 <CmdId>2</CmdId>
  <Meta>
   <Type xmlns='syncml:metinf'>message/sip</Type>
  </Meta>
  <Item>
   <Target>
    <LocURI>1234/attach id@mmss.com</LocURI>
   </Target>
  </Item>
</Get>
```

FIG. 4B

```
<Put>
 <CmdID>2</CmdID>
  <Meta>
   <Type xmlns='syncml:metinf'>application/vnd.syncml-sip</Type>
  </Meta>
  <Item>
   <Source><LocURI>1234</LocURI></Source>
            <Data>

----whole CPM message
            </Data>
   </Item>
 </Put>
```

```
<SyncML>
 <SyncHdr>
  <VerDTD>1.2</VerDTD>
  <VerProto>SyncML/1.2</VerProto>
  <SessionID>1</SessionID>
  <MsgID>1</MsgID>
  (...)
 </SyncHdr>
 <SyncBody>
  <Alert>
   <Data>200</Data>
   <Item>
    <Target>
     <LocURI>./mmss/inbox</LocURI>
     <Filter>
      <Meta><Type>application/vnd.omads-sip </Type></Meta>
      <Field>
       <Item>
       <Meta><Type>application/vnd.syncml-devinf+xml</Type></Meta>
        <Data>
         <Property>
          <PropName>cpmitem</PropName>
          <PropParam>
           <ParamName>texttype</ParamName>
           <ValEnum>text/plaim</ValEnum>
          </PropParam>
         </Property>
        </Data>
       </Item>
      </Field>
     </Filter>
    </Target>
    <Source>
     <LocURI>client-inbox</LocURI>
    </Source>
   </Item>
  </Alert>
 </SyncBody>
</SyncML>
```

70 — (brace covering Filter block)

TERMINAL AND METHOD FOR STORING AND RETRIEVING MESSAGES IN A CONVERGED IP MESSAGING SERVICE

CROSS-REFERENCE TO RELATED APPLICATIONS

This Application claims the benefit of U.S. Provisional Application No. 61/030,940, filed on Feb. 22, 2008, and U.S. Provisional Application No. 61/097,022, filed on Sep. 15, 2008.

TECHNICAL FIELD

The present invention relates to a converged IP messaging (CPM) service, and more particularly, to a terminal, server and methods for receiving, storing and retrieving messages in a CPM service or other SIP-based service system.

BACKGROUND ART

An IP multimedia subsystem (IMS) is spotlighted as essential information and communication technology for providing a new multimedia service in a next generation internet protocol (IP) based communication environment. The IMS is a set of nodes for providing various multimedia services and controlling calls in a mobile communication network environment. The IMS combines an IP network with the mobile communication environment. Accordingly, in the IMS, since a terminal and an IP network easily interact with each other, it is possible to provide multimedia services such as IP-based voice, audio, video, and data by using a mobile communication terminal.

One of the available signaling protocols of the IMS network is a session initiation protocol (SIP). The SIP is a call control protocol in an application layer for generating, modifying, and terminating an IP-based multimedia service session between user terminals or between a user terminal and an entity with an IP address by searching for a location of a target to be communicated with.

Among the various services provided through the IMS network, a converged IP messaging (CPM) service is technology for combining existing multimedia communication services such as a short messaging service (SMS), a multimedia messaging service (MMS), an E-mail service, a voice over IP (VoIP) service, a push-to (PT) service, and the like with one another and providing the combined service under an IP-based infrastructure. Unlike existing individual multimedia communication services provided through limited networks and terminals, in the CPM, it is possible to provide a converged service regardless of kinds of terminals, types of media, kinds of access networks, and types of services.

However, in the CPM system, there can be a large amount of data being communicated among a terminal and the CPM network entities in association with storage and retrieval of received CPM messages directed to the terminal. Thus, there is a need to provide procedures and devices for reducing or minimizing such data traffic in the network in order to provide an efficient message storage and retrieval system.

DETAILED DESCRIPTION OF THE INVENTION

Technical Goal of the Invention

A technical goal of the present invention is to provide a terminal, server and method for storing and retrieving CPM messages and other SIP-based messages in an effective manner.

Another technical goal of the present invention is to provide techniques for storing received messages and selectively retrieving the stored messages in parts or in entirety based on at least user preference information.

Another technical goal of the present invention is to provide a terminal, server and method for managing SIP-based messages which address the limitations and disadvantages associated with the related art.

Disclosure Properties of the Invention

According to an aspect of the present invention, there is provided a method for controlling a SIP-based message by a control server, comprising: receiving a SIP-based message; determining a manner in which the SIP-based message is to be processed based on user preference information; transmitting the SIP-based message and indication information to a storage server based on the determination result, the indication information indicating if the SIP-based message is to be sent back with link information, the link information including a reference to the SIP-based message; receiving a part of the SIP-based message and the link information from the storage server; and transmitting the part of the SIP-based message and the link information to a terminal, whereby the SIP-based message can be selectively retrieved.

According to another embodiment of the present invention, there is provided a method for controlling a SIP-based message by a terminal, comprising: receiving a part of a SIP-based message and link information from a control server, the link information including a reference to the SIP-based message and content ID information corresponding to one or more different parts of the SIP-based message; receiving a user input indicating at least one part or the entirety of the SIP-based message to be retrieved; and performing a synchronization operation with a storage server based on the user input and the link information to selectively retrieve the SIP-based message.

According to another embodiment of the present invention, there is provided a mobile terminal for controlling a SIP-based message stored at a server side, the mobile terminal comprising: a messaging client device configured to receive a part of a SIP-based message and link information from a control server, the link information including a reference to the SIP-based message and content ID information corresponding to one or more different parts of the SIP-based message; an input unit configured to receive a user input indicating at least one part or the entirety of the SIP-based message to be retrieved; and a synchronization client device configured to communicate with the messaging client device and to perform a synchronization operation with a storage server based on the user input and the link information to selectively retrieve the SIP-based message.

Advantageous Effects

In the present invention, received CPM messages and other SIP-based messages can be stored at the network side, and can be selectively retrieved based on preference information. Accordingly, it is possible to prevent unnecessary and excessive data traffic from occurring through a mobile communication channel and to stably provide a messaging service. In addition, it is possible to selectively retrieve messages or parts of the messages which are stored in a network-based storage server for a converged messaging service or a network-based storage server for existing individual messaging services through an IMS network or SIP/IP-based network without downloading the messages or media to a terminal.

BEST MODE FOR CARRYING OUT THE INVENTION

Hereinafter, embodiments of the present invention will be described in detail with reference to the accompanying drawings. The following embodiments should be considered in descriptive sense only and not for purpose of limitation.

Figure 1:
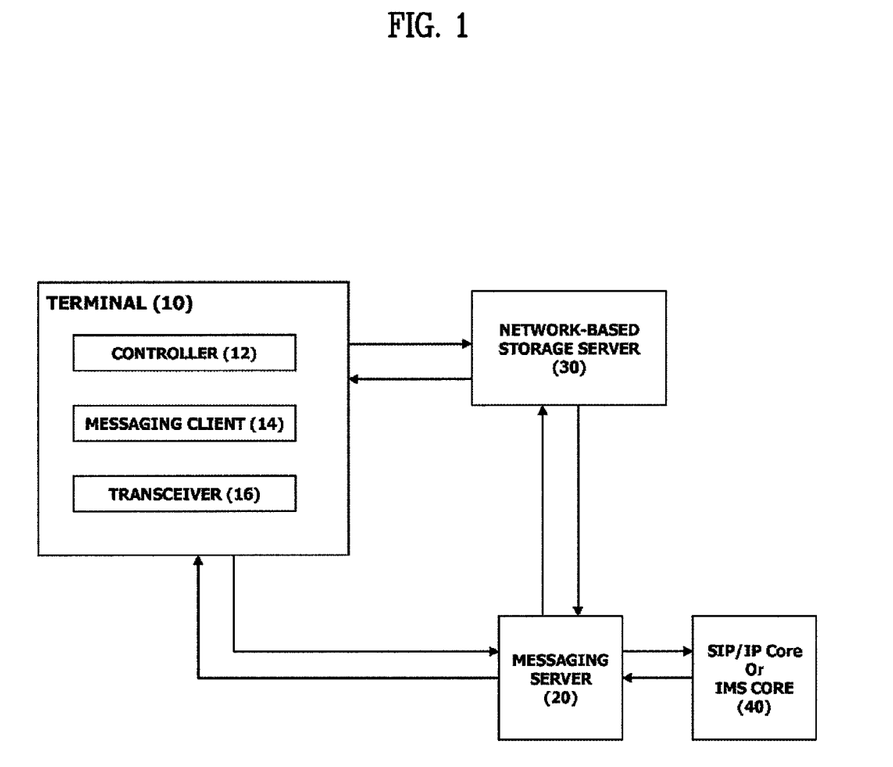
FIG. 1 is a block diagram illustrating system architecture for storing and retrieving received messages in a converged IP messaging (CPM) service system or other SIP-based message service system according to an embodiment of the present invention.

FIG. 1 is a block diagram illustrating system architecture for storing and retrieving messages in a SIP-based message service system according to an embodiment of the present invention. Referring to FIG. 1, the system architecture includes a terminal 10, a messaging server 20, a network-based storage server 30, and an IP multimedia subsystem (IMS) core such as a SIP/IP core 40. The terminal 10 and the network entities such as the messaging server 20 and the network-based storage server 30 communicate with each other through the SIP/IP core 40. All components of the system are operatively coupled and configured.

The current embodiment may be applicable to a system including the network-based storage server 30 shown in FIG. 1. A CPM system is an example of this system. The CPM system generally includes a CPM conversation server, a message and media storage (M&Ms) server, a converged address book, a CPM user preference server, an interworking function, and a CPM client. If the present invention is applied to the CPM system, the network-based storage server 30, the messaging server 20, and a messaging client 14 of the terminal 10 of FIG. 1 may correspond to a message and media storage server of the CPM system, a CPM conversation server, and a CPM client, respectively. Since architecture of the CPM system, functions of components, and interface among components are described in OMA-AD-CPM-V1_0-20071004-D and OMA-RD-CPM-V1_0-20070927-D among standardization documents of Open Mobile Alliance (OMA), detailed description on those will be omitted. Accordingly, the aforementioned standardization documents may be applied to parts that are not described in this specification.

Referring to FIG. 1, the terminal 10 is a device which makes access to a mobile communication network and communicates with a functional entity on a network such as another terminal or IMS network. A name of the terminal 10 is not limited. For example, the terminal 10 may be referred to as a device, any mobile terminal, a user equipment of a universal mobile telecommunication system (UMTS), a global system for mobile communication (GSM), a computer laptop, a PDA, a smart phone, a GPS device, a Bluetooth device, a mobile station (MS) of Inter Standard-95 (IS-95), etc. The name of the terminal 10 is not limited thereto. The terminal 10 may be a terminal of a user which desires to retrieve data/messages stored in the network-based storage server 30.

The terminal 10 can include a controller 12, a messaging client 14, and a transceiver 16. Other known components such as a display, a storage unit, etc. can also be included in the terminal 10. The controller 12 is used to control operations of internal functional entities (for example, the messaging client 14, a user interface (UI), the transceiver 16, and the like). The transceiver 16 is used to enable the terminal 10 to transmit and receive various signals to and from another terminal or network entities through the SIP/IP core 40 or other networks.

The messaging client 14 is a functional entity for enabling the terminal to use a messaging service such as the CPM service. The messaging client 14 includes a CPM client for supporting the CPM service. The messaging client 14 may be referred to as a messaging user agent (MUA). The messaging client 14 may interact with clients for existing individual messaging services such as a short messaging service (SMS), a multi-media messaging service (MMS), an E-mail service, and the like, in addition to the CPM client. Alternatively, the individual messaging service clients may be physically converged on the CPM client. This messaging client 14 begins the CPM service by interacting with another CPM component such as the messaging server 20 or network-based storage server 30 and accesses the CPM components.

The messaging server 20 is a functional entity for managing and supporting the messaging service such as the CPM service. An example of the messaging server 20 may be a CPM conversation server. The messaging server 20 uses services of other external entities in addition to the services of the CPM components so as to embody the CPM service. The messaging server 20 communicates with the terminal 10, the network-based storage server 30, and the SIP/IP core 40 and interacts with other external functional entities. For example, the messaging server 20 may acquire desirable stored data by interacting with the storage server of the system for an existing individual messaging service (for example, an E-mail service).

The network-based storage server 30 is a functional entity for storing and managing messages and other information. The network-based storage server 30 may be directly or indirectly accessed by other components of the system, for example, the messaging client 14 of the terminal 10 and the messaging server 20. An example of the network-based storage server 30 may be a message and media storage (M&Ms) server for the CPM service. The network-based storage server 30 is not limited thereto. For example, the network-based storage server 30 may be a server for storing and managing messages on a network for an existing individual messaging service (for example, an E-mail service and the like). In this case, the network-based storage server 30 may be a storage server of a system for the E-mail service, for example, an internet message access protocol (IMAP) server based on Request For Comments (RFC) 3501.

The SIP/IP core 40 is a set of control nodes for providing various multimedia services using a session initiation protocol (SIP) in a mobile communication network and controlling a call based on the SIP. The SIP/IP core 40 generally serves to register the terminal 10 and route SIP signaling for the terminal 10 or from the terminal 10 to a suitable server. For example, the SIP/IP core 40 may route SIP signaling among the terminal 10, the messaging server 20, and the network-based storage server 30, which are the CPM components.

The SIP/IP core 40 may additionally include an application server (AS) for supporting various application services which may be provided through the IMS network. The aforementioned messaging server 20 and the network-based storage server 30 may be included in the SIP/IP core 40 as the application server (AS) of the SIP/IP core 40. In this case, the messaging server 20 and the network-based storage server 30 are functionally distinguished from each other. However, the messaging server 20 and the network-based storage server 30 may be physically combined with each other or separated from each other.

Now having described the system architecture, methods according to the various embodiments of the present invention will be discussed. These methods are implemented in the system of FIG. 1, but can be applied in other suitable systems.

Figure 2:
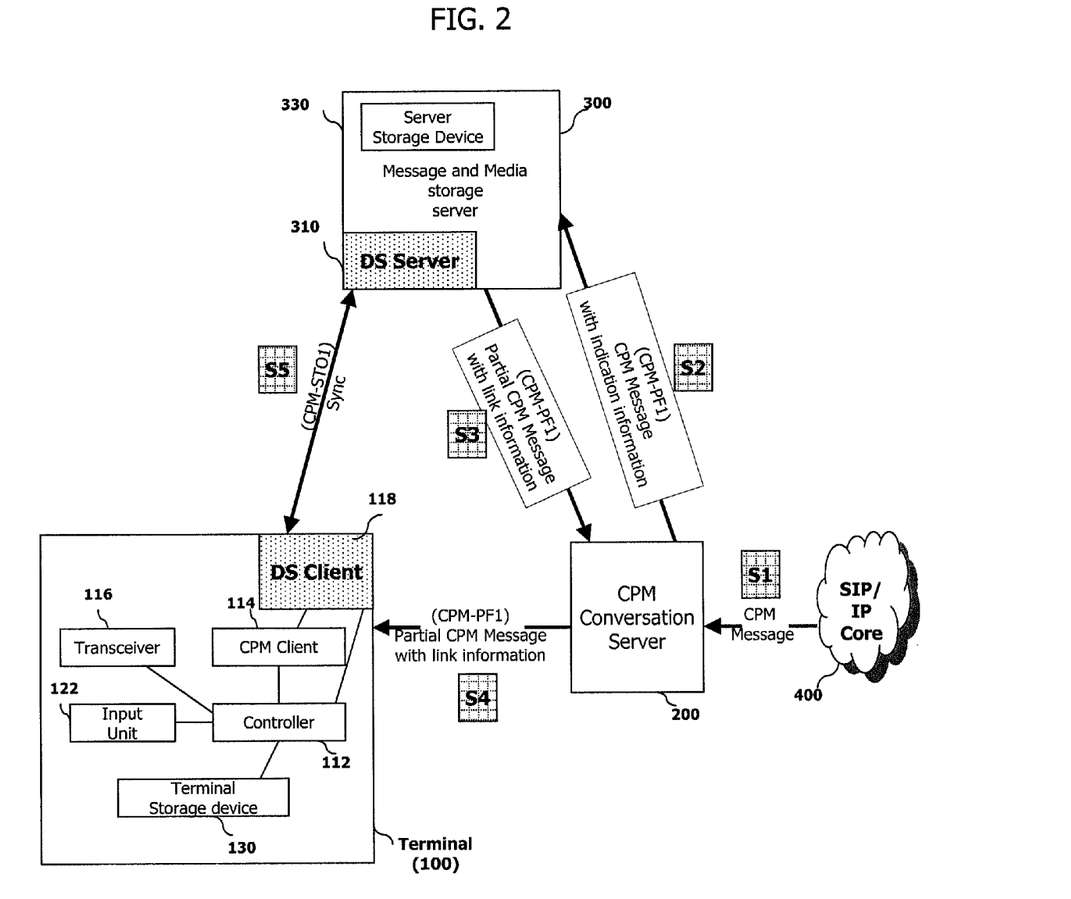
FIG. 2 is a flow diagram illustrating a method for storing and retrieving received messages in a CPM service system according to an embodiment of the present invention.
Figure 5:
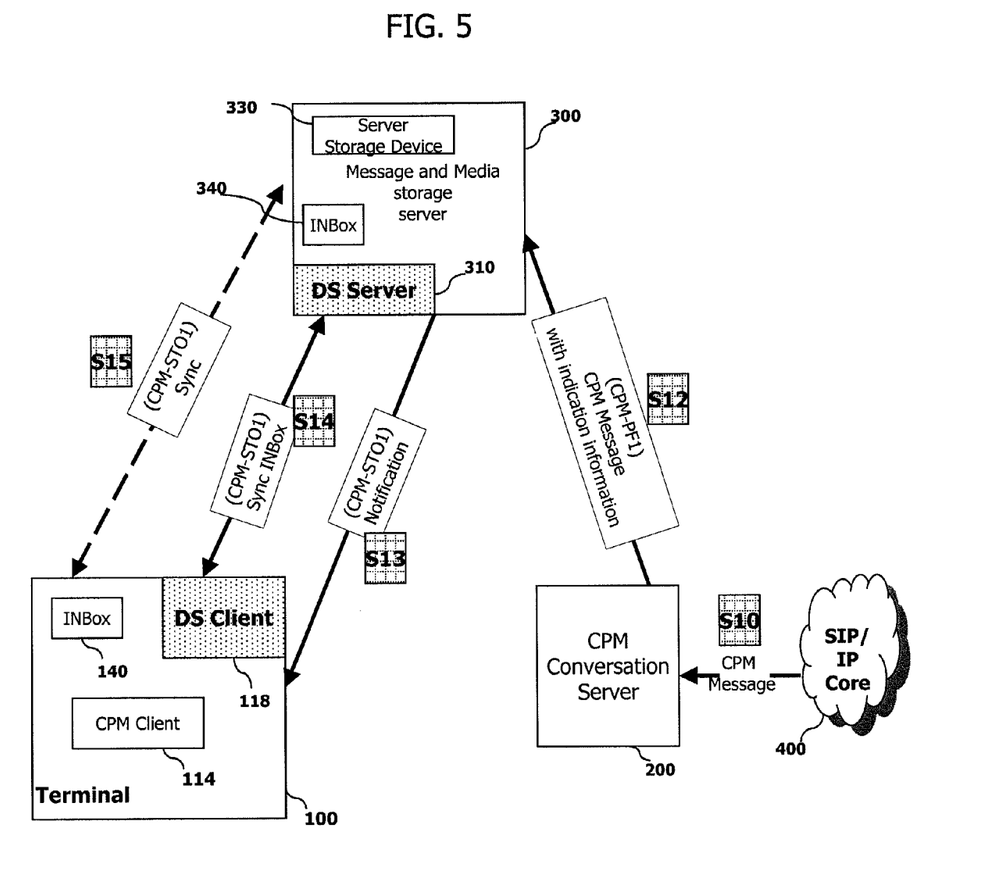
FIG. 5 is a flow diagram illustrating a method for storing and retrieving received messages in a CPM service system according to another embodiment of the present invention.

As a more specific example of the system of FIG. 1, FIG. 2 is a diagram for explaining a method for storing and retrieving data in a CPM service system according to an embodiment of the present invention. FIG. 5 is a diagram for explaining a method for storing and retrieving data in a CPM service system according to another embodiment of the present invention. The CPM service system below is discussed as an example only. However, the methods of FIGS. 2 and 5 are equally applicable to any kind of system exemplified by the system of FIG. 1.

Referring now to FIG. 2, the CPM service system according to an embodiment includes a terminal 100, a CPM conversation server 200, and a message and media storage (M&Ms) server 300 including a data synchronization (DS) server 310, and may include other components as desired. All components of the CPM service system are operatively coupled and configured. Communications between the terminal 100 and the CPM conversation server 200 and between the CPM conversation server 200 and the M&Ms server 300 may occur through a SIP/IP core 400. Further, communications between the CPM conversation server 200 and other terminals or servers (e.g., remote CPM conversation server) may occur through the SIP/IP core 400.

The terminal 100, the CPM conversation server 200 and the M&Ms server 300 correspond to and are examples of the terminal 10, the messaging server 20, and the network-based storage server 30 of FIG. 1, respectively.

The terminal 100 includes a controller 112, a CPM client 114, and a transceiver 116, which correspond respectively to the controller 12, the messaging client 14, and the transceiver 16 of the terminal 10 in FIG. 1. The terminal 100 also includes an input unit 122 for receiving user inputs, and a data synchronization (DS) client 118 for communicating with the DS server 310 of the M&Ms server 300 to synchronize data stored in the terminal 100 side with data stored in the M&Ms server 300 side as desired. For both the terminal 100 and the M&Ms server 300, data may be stored in its internal storage device or an external storage device associated thereto. The internal and/or external storage device of the terminal 100 is referred to herein as a terminal storage device 130, and the internal and/or external storage device of the M&Ms server 300 is referred to herein as a server storage device 330.

In the CPM system of FIG. 2, a user of the terminal 100 sets up his preferences on how messages (e.g., CPM messages) directed to the user are to be processed by the CPM conversation server 200 when the CPM conversation server 200 receives the messages, e.g., from another terminal or server. For example, the user of the terminal 100 can set up his preferences so that every message (for the user) received by the CPM conversation server 200 is stored in the server storage device 330 and that only a part of the message (e.g., a header only, or body without attachment, etc.) received by the CPM conversation server 200 is sent to the terminal 100.

Here, the part of the message, which is referred to herein also as a partial message, can be any part of the message, and may be only the header of the message, or only the header and body of the message without the attachment(s), or certain portions of texts of the message, but is not limited thereto.

Further, the user of the terminal 100 can set his preferences on how his messages are to be handled, through his terminal or a website or web-based portal on the Internet or other network. Such preference information is accessible by the CPM conversation server 200 and can be preferably stored on the network, e.g., in the CPM conversation server 200 or an associated network storage for storing user preference information. The terminal 100 may also have access to the same user preference information, e.g., by storing it in the terminal storage device of the terminal 100, as applicable.

Messages involved herein including CPM messages can be in any form or type and can include one or more contents or any combination thereof, such as texts, symbols, images, audio-clips, video-clips, pictures, e-mails, text messaging, etc.

Referring now to the steps of FIG. 2, at step S1, the CPM conversation server 200 receives a message directed to the user of the terminal 100 (or to the terminal 100) from another entity. The entity sending the message can be, for example, another CPM client, another CPM conversation server, any network entity, another terminal, etc. The received message is preferably a CPM message, but can be any other SIP-based message as mentioned above, and is received through the SIP/IP core 40 or some other known channel.

At step S2, the CPM conversation server 200 checks the user's preference information to determine the manner in which the received message needs to be handled. As discussed above, the user's preference information can be stored in the CPM conversation server 200 or any other location accessible by the CPM conversation server 200. Preferably the user's preference information is set by the user and followed; however, the CPM conversations server 200 may consider other information to determine how the received message of the user will be handled. For example, the CPM conversation server 200 may further consider the network load and/or operator policy information (e.g., network load may require the CPM conversation server 200 to process the received message differently from the user's preference information).

Still at step S2, based on the user's preference information, the CPM conversation server 200 handles the received CPM message. For example, based on the user's preference information (and other information if applicable), the CPM conversation server 200 determines whether the received CPM message is to be stored in the M&Ms server 300 or sent to the terminal 100. If the received CPM message is to be stored in the M&Ms server 300, then the CPM conversation server 200 determines either (a) the M&Ms server 300 stores the message and sends back a partial message with link information or (b) the M&Ms server 300 merely stores the message (this means the terminal 100 will not receive the message unless the terminal 100 downloads it directly from the M&Ms server 300). Based on these determinations, the CPM message is handled.

For example, assuming that the user would like to receive only a part of the messages (e.g., header only, only first paragraph of the message text, no attachment, or any other part of the message) and has set the user's preference information accordingly, the CPM conversation server 200 sends the received CPM message (full CPM message) with indication information to the M&Ms server 300. This can be performed through a SIP-based interface known as CPM-PF1 that is established between a M&Ms server and a CPM conversation server according to known CPM specifications.

The CPM conversation server 200 can generate the indication information based on the user's preference information. The indication information can be in any form or type, and indicates to the M&Ms server 300 how the received message is to be handled. Only as an example, the indication information can be a Boolean tag/flag named "TobeSentBack" which has a value of 0 or 1 indicating the following:

TobeSentBack=1 which indicates that the M&Ms server has to store the message and send back the message (a part of the message) with link information to the CPM conversation server.

TobeSentBack=0 which indicate that the M&Ms server merely needs to store the message.

At step S3, the M&Ms server 300 receives the CPM message (full CPM message) and the indication information from the CPM conversation server 200, and handles the CPM message based on the indication information. For example, if the flag "TobeSentBack" has a value of 0, then the M&Ms server 300 stores the received full CPM message in the server storage device 330, which can be part of the M&Ms server 300 or can be a separate entity accessible by the M&Ms server 300. On the other hand, if the flag "TobeSentBack" has a value of 1, then the M&Ms server 300 generates link information and sends back a part of the CPM message (partial CPM message) with the link information to the CPM conversation server 200. This can be performed through the known SIP-based interface, CPM-PF1.

The link information can be in any form or type (e.g., a tag), and is information that can be used by the terminal 100 to access the full CPM message or other part(s) of the CPM message associated with the partial CPM message. For example, the link information can in the form of URLs and include URL information. In another example, the link information can be or include a global unique identifier (GUID) assigned to the CPM message stored in the server storage device 330. Here, the M&Ms server 300 stores received messages (contents) as objects in the server storage device 330, where each object in the server storage device 330 is given a unique identifier or number for uniquely identifying the object in the server storage device. This unique identifier is known as the GUID.

In another example, the link information can include the GUID of the received CPM message and content ID information of the received CPM message. The content ID information represents identifiers given to one or more different parts of the CPM message, for selectively retrieving the different part(s) of the CPM message by the terminal 100. For instance, in a given message, the message can be divided into different parts, and a plurality of different content IDs are given respectively to the different parts of the message stored in the M&Ms server, so that each and any part of the message can be selectively retrieved by the terminal 100 or other entity using the corresponding content ID. The message can be divided into parts in any manner, e.g., the body and the attachment(s) can be different parts, different paragraphs in a text message can be different parts, all the attachments can be different parts, etc. In one example, only the attachments to the message may be given content IDS so that a user of the terminal can download the body of the message using the GUID and if desired, additionally any attachment(s) using the content IDs.

Figure 3:
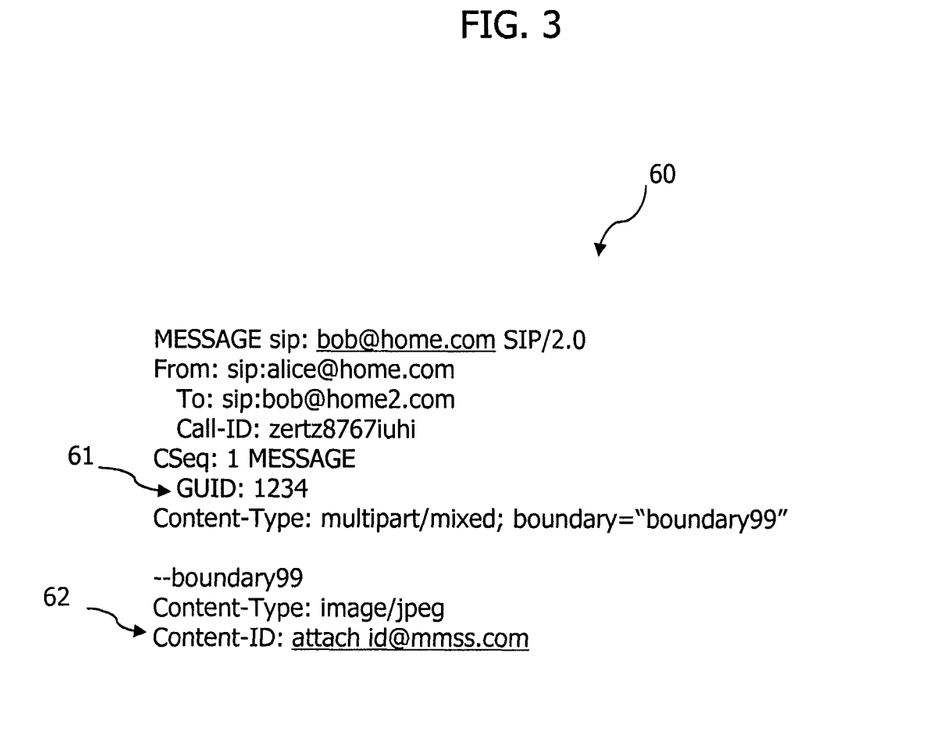
FIG. 3 is an example of a partial CPM message with link information according to the present invention.

FIG. 3 shows an example of a partial CPM message 60 with its link information, which can be sent from the M&Ms server 300 to the CPM conversation server 200. In this example, the CPM message involved includes a body (main content) and one attachment. As shown in FIG. 3 in a non-limiting example, the link information can include a GUID 61 and content ID information 62. The GUID 61 (e.g., "1234") can be a unique identifier for identifying and/or accessing the entire CPM message (corresponding to the partial CPM message 60) stored in the server storage device 330. The content ID information in this example is a content ID 62 "attach_id@mmss.com" for identifying the attachment to the message. Other examples and variations are of course possible and encompassed by the present invention.

At step S4, once the CPM conversation server 200 receives the partial CPM message and the corresponding link information, the CPM conversation server 200 sends or forwards the partial CPM message and the link information to the terminal 100, e.g., through the interface, CPM-PF1.

Once the terminal 100 receives the partial CPM message and the corresponding link information, the terminal 100 can notify the user of the terminal 100 of the receipt. For instance, the partial CPM message (e.g., just the header information including, e.g., sender, recipient, date, subject line, any attachment listing) can be displayed on a display associated with the terminal 100.

At step S5, if the user of the terminal 100 desires to retrieve the entire CPM message of the partial CPM message or any part(s) of the CPM message, then the user can instruct the terminal 100 to retrieve the message as desired. For example, the user can select the partially received message and press a 'retrieve' button to retrieve the entire message. In another example, the user can select the partially received message, which in turn gives a list of options from which the user can select to down the entire message or any desired part(s) thereof. The list can list different parts of the message corresponding to the content IDs if the content IDs are included in the received link information. Accordingly, the user can choose to retrieve any part or all parts of the message independently, after viewing the partially received message information, whereby only the desired items associated with the message can be retrieved. This effectively reduces data traffic and data exchange time between the terminal and the network entities.

Figure 4A:
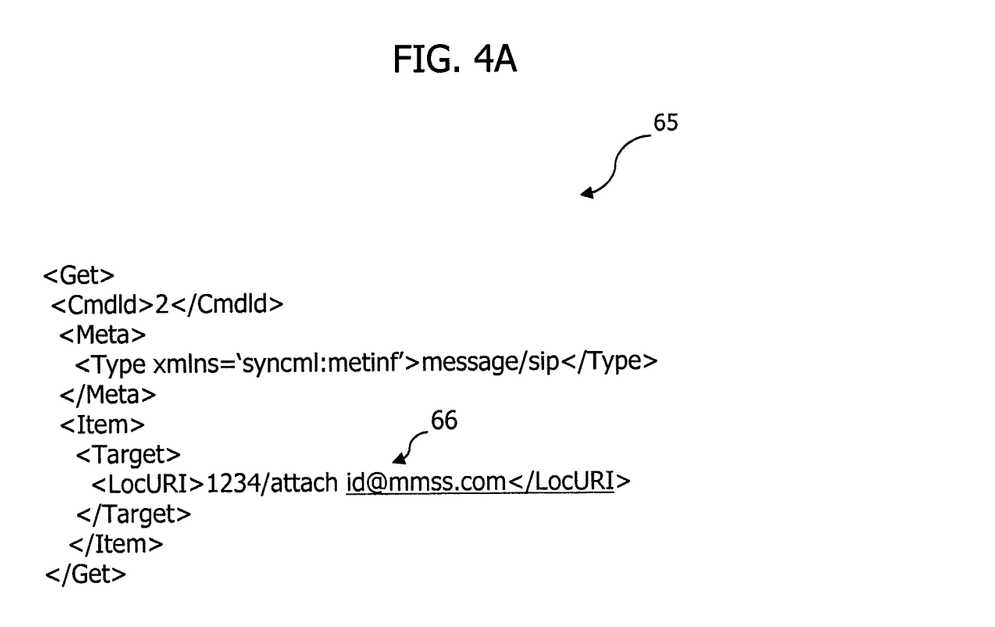
FIGS. 4A and 4B are respectively examples of a GET command and a PUT command according to the present invention.

At step S5, according to the user's instructions, the terminal 100 can download or retrieve the CPM message using a synchronization operation such as a DS (data synchronization) operation or an INBOX synchronization operation, e.g., through a known SIP-based interface CPM-ST01. The DS operation can be performed using known commands such as a GET command and a PUT command. For instance, the terminal 100 (e.g., DS client 118) can send a GET command to the M&Ms server 300 (e.g., DS server 310). A non-limiting example of such a GET command 65 is shown in FIG. 4A. As shown in FIG. 4A, the GET command includes identifier(s) 66 for retrieving the desired CPM message or parts thereof. In this example, the identifier 65 "1234/attach_id@mmss.com" indicates that the message corresponding to the GUID '1234' and the attachment 'attach_id@mmss.com' need to be retrieved.

Figure 4B:
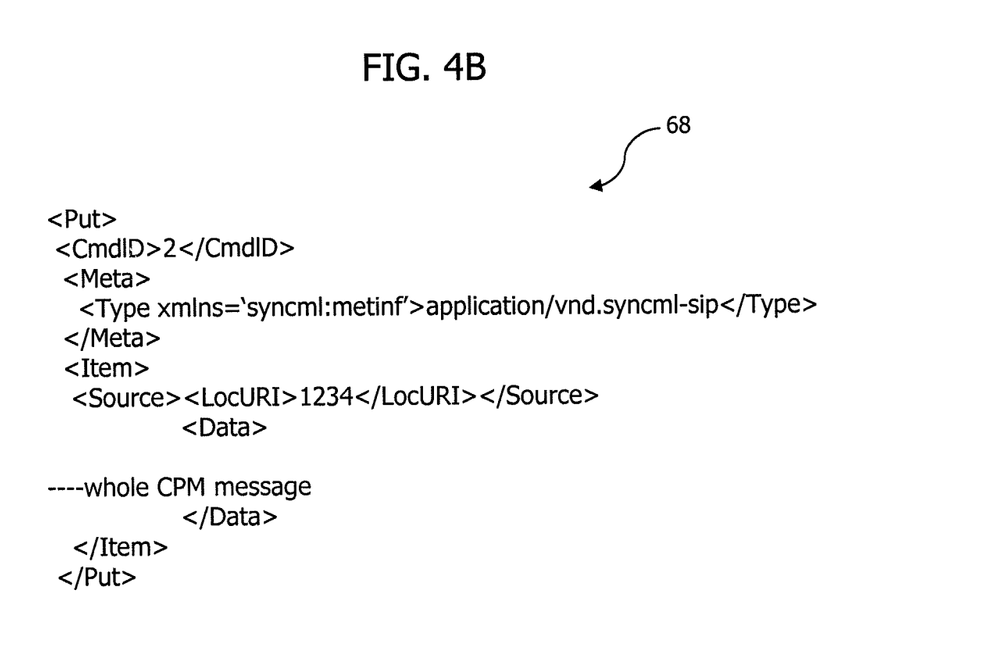

Then the M&Ms server 300 replies to the GET command and provides a PUT command to the terminal 100. An example of such a PUT command 68 is shown in FIG. 4B, where the PUT command 68 includes the requested message or parts of the message. The DS client 118 can interact with the CPM client 114 of the terminal to retrieve the desired message (or parts thereof), and can replace the partial message with the retrieved message. Then the terminal 100 provides or display the final message or part(s) thereof to the user.

If the link information includes a GUID but no content ID information, then the entire CPM message (which can include attachment(s)) can be retrieved by the terminal 100 using the GUID alone.

Accordingly, the present invention advantageously allows storage of a received CPM or other SIP-based message at the network side and selective retrieval of the receive message or parts thereof by a terminal.

FIG. 5 is a flow diagram illustrating a method for storing and retrieving received messages in a CPM service system according to another embodiment of the present invention. The CPM service system of FIG. 5 preferably has the same components as FIG. 2, but can be modified as desired. Thus, a description of the various components of the system in FIG. 5 will not be repeated herein.

Referring to FIG. 5, at step S10, a SIP-based message such as a CPM message directed to the terminal 100 is received by the CPM conversation server 200 from a remote server or terminal. Step S10 is identical or similar to step S1 of FIG. 2.

At step S12, based on the user's preference information for the terminal 100, the CPM conversation server 200 sends the received CPM message with indication information to the M&Ms server 300. Step S12 is identical or similar to step S2 of FIG. 2, except for the indication information. The indication information generated and sent from the CPM conversation server 200 to the M&Ms server 300 in step S12 indicates the manner in which the message is to be handled, namely, if the M&Ms server 300 needs to notify the terminal 100 regarding the received message or to wait for a synchronization initiation from the terminal 100 without sending the notification to the terminal 100. The manner of handling the message is preferably made according to the user's preference information and any other information (e.g., network load and/or policy information) if applicable, where the preference information can be preset by the user.

An example of the indication information (e.g., 'TobeSent' flag) at step S12 is as follows:
  TobeSent=1 which means the M&Ms server has to notify the terminal regarding the received message.
  TobeSent=0 which means the M&Ms server does not send the notification, but needs to wait until the terminal initiate a sync by itself.

At step S13, the M&Ms server 300 stores the received CPM message (full message) in the server storage device 330, and handles the message according to the indication information. In an example, all CPM messages received for the user of the terminal 100 (or the terminal 100) may be stored in association with the user or the terminal 100 in the server storage device 330. The M&M server 300 can also put the received CPM message in its INBOX 340. If the indication information indicates that the notification is to be sent, the M&Ms server 300 sends a notification to the CPM client 114 of the terminal 100, and this notification can indicate to the terminal 100 that there is a change in the INBOX 340 of the M&Ms server 300 for this user or terminal 100. The notification can be in any form or type, and an example of such notification is a server alerted notification (SAN) message. Using the SAN, the DS server 310 notifies the DS client 118 to initiate a synchronization session using methods/protocols such as HTTP, WAP PUSH, SMS, etc.

According to the DS protocols, the terminal 100 has its own DS INBOX 140 and the M&Ms server 300 also has its own DS INBOX 340 (and also corresponding OUTBOXes). The INBOX 340 is a folder containing messages that are received, e.g., for the user of the terminal 100.

At step S14, once the notification is received, the CPM client 114 initiates a synchronization of the INBOX 140 of the terminal 100 and the INBOX 340 of the M&Ms server 300 to retrieve the messages or information in the INBOX 340, e.g., through a SIP-based interface CPM-STO1. The terminal 100 can be set up to automatically perform such synchronization periodically or when a notification is received. In such a case, the notification at step S13 is not displayed or known to the user. In a variation, the user of the terminal 100 may decide and instruct whether or not to perform such synchronization based on the user's preferences. In such a case, the user may receive some kind of notification regarding the status of the INBOX 140, and then decide to perform synchronization in view of this notification.

Figure 6:
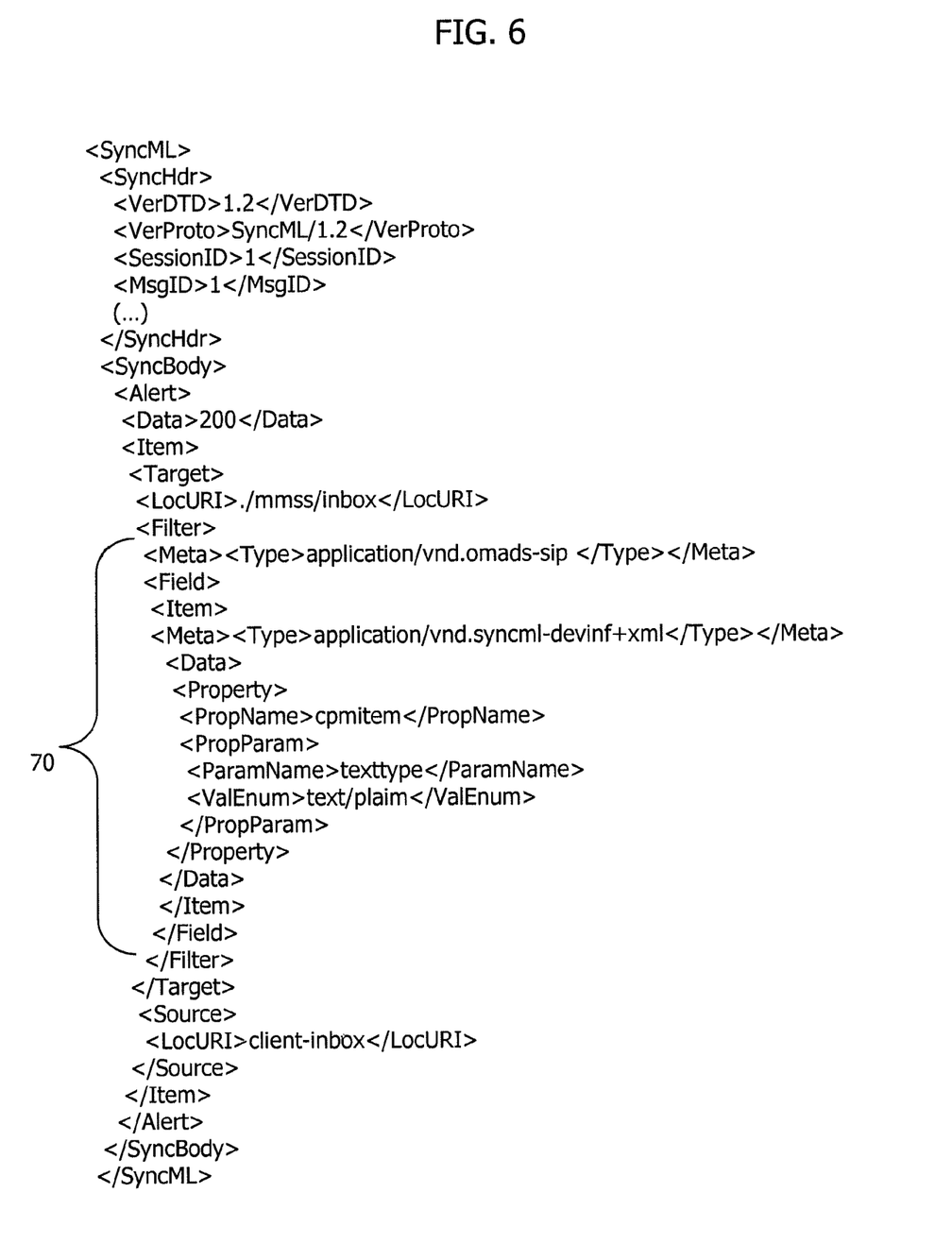
FIG. 6 is an example of an INBOX synchronization request according to the present invention.

In a variation, the user can configure his terminal so that only certain parts of received messages are retrieved automatically from the INBOX 340, and such configuration information (filter information) can be stored in the terminal 100. For instance, the user can specify that only "text/plain" type parts of received messages are to be retrieved. An example of such synchronization request to be sent from the DS client 118 to the DS server 310 in connection with the INBOX synchronization operation is shown in FIG. 6. As shown in FIG. 6, the request includes filter information 70 which indicates desired items (e.g., only the text/plain type parts) of the message to be retrieved. According to this request, the INBOX 140 of the terminal 100 will receive or retrieve only the text/plain type parts of the message from the INBOX 340 of the M&Ms server 300 through the INBOX synchronization operation. Then the retrieved message (full) or parts thereof can be displayed to the user of the terminal 100, via the display unit of the terminal 100.

Optionally at step S15, the user may retrieve the entire message using a DS synchronization, e.g., by selecting a 'retrieve' button. This step is the same as or similar to step S5 of FIG. 2. For instance, in case only certain parts of the message were retrieved in step S14, step S15 may be performed to retrieve the full message if desired. However, the terminal 100 can be set up so that it is possible to retrieve the entire message in step S14 if desired.

While the present invention has been particularly shown and described with reference to exemplary embodiments thereof, it will be understood by those skilled in the art that various changes in form and details may be made therein without departing from the spirit and scope of the present invention as defined by the appended claims.

INDUSTRIAL APPLICABILITY

The present invention may be applicable to a converged messaging service through a mobile communication network.

What is claimed is:
1. A method for controlling a Session Initiation Protocol (SIP)-based message at a storage server, the method comprising:
  receiving the SIP-based message including indication information from a control server, wherein the indication information indicates a manner in which the SIP-based message is to be handled by the storage server;
  transmitting a first part of the SIP-based message and link information to the control server when the indication information indicates that the SIP-based message is to be sent back to the control server;

transmitting a notification message from the storage server to a terminal when the indication information indicates that the storage server notifies the terminal regarding the SIP-based message; and performing a synchronization with the terminal when the terminal initiates the synchronization, wherein the synchronization includes:

receiving a get command including a URI (uniform resource indicator) from the terminal, when the URI is represented by a global unique identifier (GUID) of the SIP-based message, a delimiting character, and a content identifier, transmitting a put command including a second part of the SIP-based message indicated by the content identifier to the terminal, and when the URI is represented by the global unique identifier (GUID) of the SIP-based message, transmitting a put command including the SIP-based message to the terminal.

2. The method of claim 1, wherein the SIP-based message is a Converged IP Messaging (CPM) message.

3. The method of claim 1, wherein the link information includes the global unique identifier (GUID) of the SIP-based message.

4. The method of claim 1, wherein the link information includes the content identifier for identifying the second part of the SIP-based message.

5. The method of claim 1, wherein the SIP-based message comprises a plurality of parts, and the link information includes a plurality of content identifiers respectively assigned to the plurality of parts of the SIP-based message for selectively retrieving one or more parts of the SIP-based message.

6. A method for controlling a Session Initiation Protocol (SIP)-based message at a control server, the method comprising:

receiving the SIP-based message;

transmitting the SIP-based message including indication information to a storage server based on user preference information, wherein the indication information indicates a manner in which the SIP-based message is to be handled by the storage server;

when the indication information indicates that the SIP-based message is to be sent back to the control server, receiving a first part of the SIP-based message and link information from the storage server; and transmitting the first part of the SIP-based message and the link information to a terminal; and performing a synchronization with the terminal when the terminal initiates the synchronization, wherein the synchronization includes:

receiving a get command including a URI (uniform resource indicator) from the terminal, when the URI is represented by a global unique identifier (GUID) of the SIP-based message, a delimiting character, and a content identifier, transmitting a put command including a second part of the SIP-based message indicated by the content identifier to the terminal, and when the URI is represented by the global unique identifier (GUID) of the SIP-based message, transmitting a put command including the SIP-based message to the terminal.

7. The method of claim 6, wherein the SIP-based message is a Converged IP Messaging (CPM) message.

8. The method of claim 6, wherein the link information includes the global unique identifier (GUID) of the SIP-based message.

9. The method of claim 6, wherein the link information includes the content identifier for identifying the second part of the SIP-based message.

10. The method of claim 6, wherein the SIP-based message comprises a plurality of parts, and the link information includes a plurality of content identifiers respectively assigned to the plurality of parts of the SIP-based message for selectively retrieving one or more parts of the SIP-based message.

\* \* \* \* \*